July 3, 1962  J. P. BRUCK  3,042,463

BEARING SEAL

Filed Jan. 4, 1960

INVENTOR.
JOHN P. BRUCK
BY
ATTORNEYS

United States Patent Office 3,042,463
Patented July 3, 1962

3,042,463
BEARING SEAL
John P. Bruck, Toledo, Ohio, assignor to American-Lincoln Corporation, Toledo, Ohio, a corporation of Ohio
Filed Jan. 4, 1960, Ser. No. 232
2 Claims. (Cl. 308—187.1)

The present invention relates to a lubricant seal, and, more particularly, relates to a grease seal for use with a bearing-supported rotating shaft in which the bearing is permeable to the flow of lubricant.

In many motor driven machines, one of the more serious problems encountered in the operation thereof is the leaking of lubricant from the interior of gear boxes and the like, especially in those instances where a rotating motor or armature shaft extends into the gear box and is supported for rotation by anti-friction bearings which are permeable to the flow of lubricant axially of the shaft. One particular area in which this lubricant leakage problem is especially acute is in machines for scrubbing rugs and the like where such leakage can cause permanent damage to the material being cleaned if the lubricant is thrown out of the machine. Such scrubbing machines generally comprise an electric motor having an armature shaft which extends from the motor enclosure into a suitable gear case or housing in which said armature shaft is geared to the shaft on which the scrubbing brushes are mounted. The armature shaft is generally mounted for rotation in suitable bearings, preferably ball or roller bearings, at the entrance thereof into the gear housing. During operation of the machine, a pressure approximating 5 to 10 pounds per square foot is created inside the grease-filled gear housing due to the pumping action of the gears. The grease, of course, becomes thin upon heating up and eventually is pushed up and works out past the bearing. Upon working past the bearing and into the motor enclosure, this escaping grease may be thrown out of the enclosure by a cooling fan mounted on the armature shaft and onto the floor or rug being cleaned. Although various means have been employed in an attempt to obviate this difficulty, none of such means have to my knowledge been completely successful.

It is, therefore, the principal object of the present invention to provide an improved grease seal.

More particularly, it is a further object of the invention to provide a grease seal which is effective to prevent the escape of grease through a lubricant-permeable bearing in which a shaft is mounted for rotation.

A still further object of the invention is to provide an efficient yet inexpensive grease seal for bearings which is easily installed and does not require changes in location or structure of any of the parts normally employed in the machine for which the seal is adapted.

Other objects and advantages will in part be apparent and will in part appear hereinafter.

For a better understanding of the nature and objects of the invention, reference should be had to the following detailed description and drawings in which.

Figure 1:
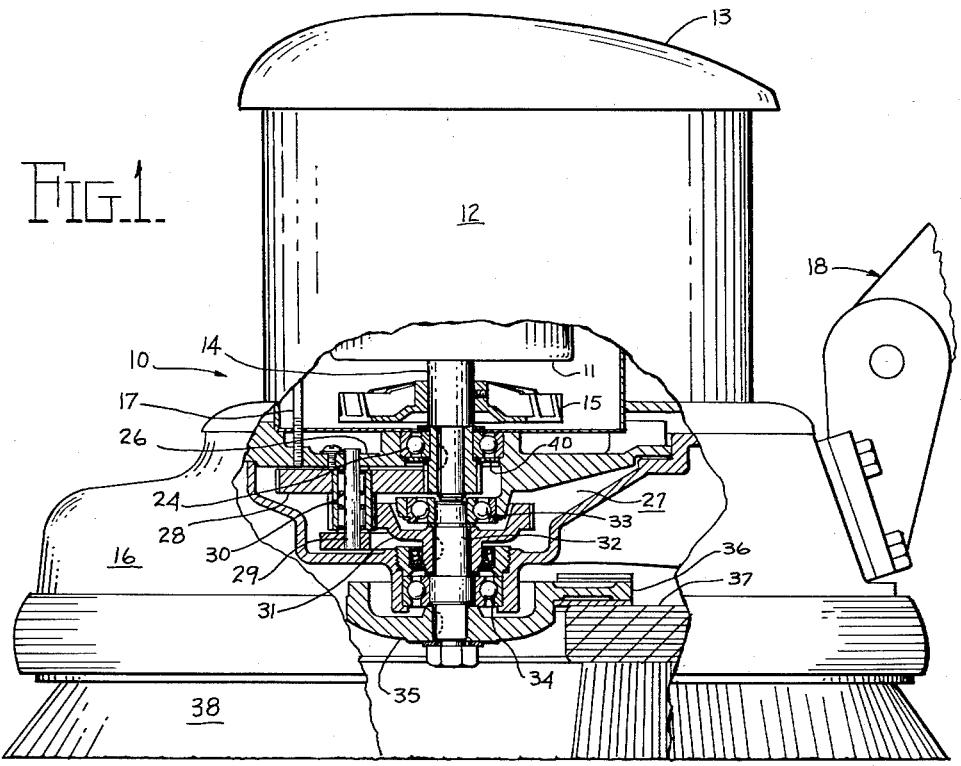
FIG. 1 is a side elevational view of a scrubbing machine with parts broken away and parts in cross section, in which a bearing or grease seal in accordance with the invention is employed.

It should be understood that although the bearing seal in accordance with the invention is shown and described in connection with a scrubbing machine, such seal is by no means limited in its application to such an apparatus, being described and shown in the particular machine for purposes of illustration only.

Referring now to the drawings, reference numeral 10 designates generally a rug or floor cleaning or polishing machine. An electric motor 11 is contained in a motor housing or casing 12 which is closed at its upper end by a cap or cover member 13 in which is journaled by means of suitable anti-friction bearings (not shown), the upper end of the armature or motor shaft 14.

Located directly below the motor 11 in the casing 12 and mounted upon the motor shaft 14 is a ventilating or cooling fan 15. A suitable flange (not shown) extends in the interior of the casing 12 between the motor 11 and the fan 15 a sufficient distance to guide or direct the current of cooling air downwardly through the motor.

A body casing or housing 16 extends from the bottom of the motor casing 12 and is preferably secured thereto and to the cover member 13 by means of a plurality of bolts such as shown at 17. An adjustable handle, indicated generally at 18, is fixed to the rear of the body casing 16 and projects rearwardly therefrom, a suitable switch being provided at the upper end of the handle (not shown) which enables the operator to start and stop the motor 11 as is customary in machines of this type.

The motor shaft 14 is provided with an annular shoulder 19 at its entrance into the body casing 16. A drive pinion 20 comprising a toothed portion 20a and a journaled portion 20b surrounds the lower end of the motor shaft 14 and is keyed thereto as indicated generally at 21. The pinion 20 is held against vertical displacement and in abutment with the shoulder 19 by means of a snap ring 22 which cooperates with a suitably provided groove 23 formed on the lower end of the motor shaft 14. The drive pinion and motor shaft are journaled in an anti-friction bearing 24, which, in the particular instance, is shown as a ball bearing. The bearing 24 is held in position by an annular shoulder 25 formed in a casting 26, which casting forms the upper wall of a gear case 27, and is urged against the shoulder 19 by the drive pinion 20.

The drive pinion 20 is part of a reduction gear train between the motor and driven machine parts and meshes with a gear 28 which is journaled on a shaft 29 by means of ball bearings 30, which gear 28, in turn, meshes with a gear 31 suitably keyed to a stub shaft 32. The stub shaft is journaled in suitable bearings indicated at 33 and 34, and is keyed at the lower extremity thereof to a generally U-shaped member 35. The U-shaped member 35 is provided with an arm 36 which engages a hub or boss 37 forming the upper part of a suitable scrubbing or polishing brush 38.

As will be appreciated, the gear case 27 is packed with grease to provide suitable lubrication for the parts disposed therein. As was previously mentioned, a substantial pressure is created in tthe gear case 27 during operation of the machine by the pumping action of the gears, which pressure has been found to thin the grease and to cause it to be pushed out of the gear case past the bearing 24, said grease then often being thrown out of the motor housing 12 by the fan 15 causing permanent damage to rugs and the like being cleaned.

The primary feature of the present invention is the provision of a bearing seal including a dished plate member 40 surrounding the journaled portion 20b of the drive pinion 20 and the reduced diameter portion of the motor shaft 14 and extending radially across at least the permeable portion of the bearing 24. The annular dished plate is provided with a central bore 41 of substantially the same diameter as the journaled portion of the drive pinion 20, and additionally preferably comprises a plurality of hemispherical, raised nubbins 42 spaced circumferentially on the underside of the plate or that surface thereof having a convex configuration such as is indicated at 43. In the embodiment illustrated, the outer diameter of the dished plate 40 is made to substantially correspond to the diameter of the annular shoulder 25 provided in the casting 26. The dished plate is preferably made of a metal such as brass or of nylon or other suitable material which provides an effective bearing surface as well as a certain amount of resiliency which would tend to restore the plate to a dished configuration.

Figures 2, 3, 4:
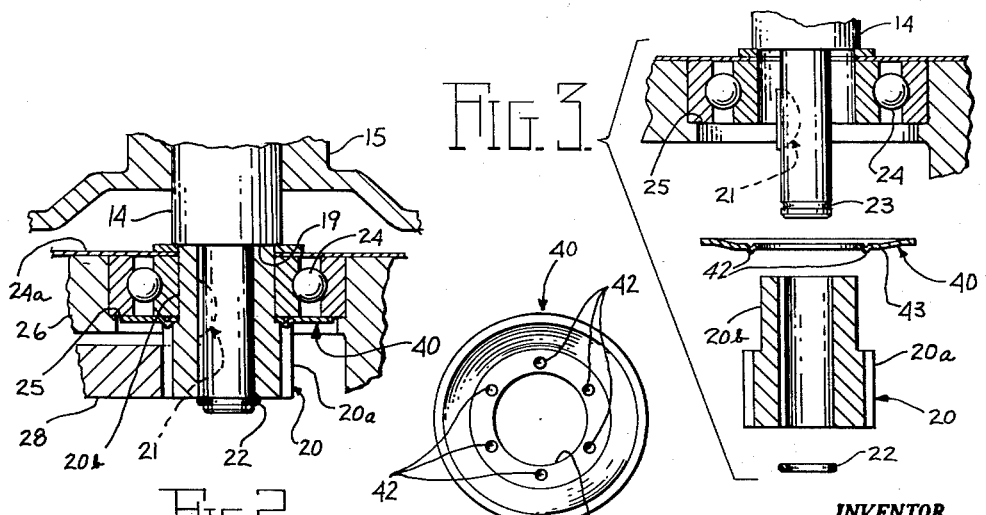
FIG. 2 is an enlarged fragmentary, cross sectional view of the bearing seal in accordance with the invention and the adjacent cooperative fitting parts including the armature or motor shaft and bearing therefor.
FIG. 3 is an enlarged, fragmentary, exploded view of the bearing seal, rotating shaft, bearing, drive pinion, and snap ring prior to assembly of same.
FIG. 4 is a top plan view of the bearing seal in accordance with the invention.

In assembling the machine including the incorporation of the bearing seal, the dished plate member 40 is slid over the journaled portion 20b of the drive pinion, and then these members are pushed upwardly onto and surrounding the motor shaft 14. An upward force is then applied to the drive pinion 20 causing the toothed portion 20a of the pinion to press against the inner circular edge at the undersurface or convex side of the dished plate whereby said dished member is caused to assume a substantially flat configuration as shown in FIGS. 1 and 2 and the motor shaft 14 to become keyed in the drive pinion. With the pressure thus applied, the lower end of the drive pinion is positioned just above the groove 23 and the snap ring 22 is then placed on the motor shaft 14 to maintain the upward force on the drive pinion and in the same manner hold the dished plate in substantially flat abutting relationship on the lower surface of the bearing 24. The bearing 24 is, of course, held in its position by being urged against the shoulder 19 of the shaft 14.

The nubbins or projections 42 act as drivers for the dished plate to cause rotation of the plate with the drive pinion and the inner bearing race. To function properly as a seal it is necessary that the flattened resilient plate turn with the gear and inner race elements.

As will now be apparent, the dished member in its stressed, flattened condition provides an efficient seal against the hot lubricant forcing its way in between the bearing surfaces and into the motor casing 12. Further, due to the relatively simple structure of the seal member and the ease of assembly and adaptation thereof for use in various types of machines, such member provides an extremely inexpensive means for preventing the leakage of lubricant from a gear case or the like.

In its simplest embodiment, the bearing seal in accordance with the invention basically comprises a dished plate member extending radially across at least the permeable portion of a bearing, and means for applying and maintaining a force on the dished member in an amount sufficient to cause it to assume a substantially flat, stressed configuration in contact with the bearing.

While what has been described is considered to be the most advantageous embodiment of the invention, it is apparent that many modifications and variations can be made in the specific construction, arrangement or form of the cooperating parts without departing from the spirit and scope of the invention as defined in the appended claims.

I claim:

1. In combination with a grease seal for a bearing-supported rotating shaft in which the bearing has an inner race and an outer race with an intermediate portion which is permeable to the flow of lubricant, a shoulder on said shaft in engagement with the inner race of the bearing, a dished annular plate member having a central hole through which said shaft extends, said member having a diameter such that an outer circular edge of said member can contact the outer race of the bearing with the member extending radially across at least the premeable portion of said bearing, said member having an inner circular edge portion around said central hole, said edge portion having a plurality of projections extending therefrom in a direction away from said bearing, force applying means to apply force against said projections of said plate member to move said member to a substantially flat configuration against said bearing, means for rotating said force applying means, said force applying means engaging said projections to rotate said plate member as said force applying means is rotated, and means to retain said force applying means against axial displacement on said shaft and to press said plate member between said force applying means and said bearing to urge said bearing portion toward said shaft shoulder.

2. The combination according to claim 1 wherein said force applying means is a gear functionally integral with said shaft, and said projections extend between at least some of the adjacent teeth of said gear.

References Cited in the file of this patent

UNITED STATES PATENTS

| | | |
|---|---|---|
| 2,004,440 | Kazenmaier et al. | June 11, 1935 |
| 2,460,740 | Frei | Feb. 1, 1949 |
| 2,481,430 | Koller | Sept. 6, 1949 |
| 2,507,804 | Minnis | May 16, 1950 |
| 2,600,434 | Saywell | June 17, 1952 |
| 2,637,605 | Powers | May 5, 1953 |
| 2,908,536 | Dickey | Oct. 13, 1959 |